(12) United States Patent  (10) Patent No.: US 7,448,663 B2
Fujimoto et al.  (45) Date of Patent: Nov. 11, 2008

(54) GUARD STRUCTURE FOR VEHICLE SEAT LOCK

(75) Inventors: Yukinori Fujimoto, Kakogawa (JP); Katsuji Fujii, Tatsuno (JP); Ichiro Umetani, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/508,358

(22) Filed: Aug. 23, 2006

(65) Prior Publication Data

US 2007/0068201 A1 Mar. 29, 2007

(30) Foreign Application Priority Data

Aug. 31, 2005 (JP) ............................. 2005-251336

(51) Int. Cl.
*E05B 17/20* (2006.01)
*B62J 1/14* (2006.01)
*E05B 65/52* (2006.01)
*E05B 71/00* (2006.01)
*B65D 55/02* (2006.01)
*B62H 5/00* (2006.01)

(52) U.S. Cl. ........................... 296/63; 70/166; 70/258; 70/417; 292/150; 296/37.1

(58) Field of Classification Search ............... 296/37.1, 296/63, 65.01, 66; 70/158, 159, 160, 161, 70/162, 163, 166, 167, 168, 169, 233, 256, 70/258, 261, 416, 417, 418; 248/551, 553; 292/137, 141, 143, 146, 150, 161

See application file for complete search history.

(56) References Cited

U.S. PATENT DOCUMENTS

| 4,907,428 | A  | * | 3/1990 | Nakashima et al. ........... 70/264 |
| 6,240,754 | B1 | * | 6/2001 | Petersen ....................... 70/417 |
| 6,623,071 | B2 | * | 9/2003 | Kawamoto et al. ..... 297/195.13 |
| 2001/0022247 | A1 | * | 9/2001 | Mori et al. ................... 180/219 |
| 2006/0220406 | A1 | * | 10/2006 | Misaki et al. .............. 296/37.1 |
| 2007/0068201 | A1 | * | 3/2007 | Fujimoto et al. ............... 70/57 |

FOREIGN PATENT DOCUMENTS

| EP | 482610 A | * | 4/1992 | ................. 180/219 |
| JP | 2002205670 A | * | 7/2002 | ................. 180/219 |
| JP | 2004-011257 | | 1/2004 | |

\* cited by examiner

*Primary Examiner*—Glenn Dayoan
*Assistant Examiner*—Paul A Chenevert (57) ABSTRACT

A guard structure for a vehicle seat lock includes a cable 54 operatively connecting between a seat locking mechanism (49) for a vehicle seat and a key device (51) adapted to be actuated by a key. The guard structure also includes a guard body (81) for blocking an access from outside of a vehicle body to the cable (54).

12 Claims, 11 Drawing Sheets

GUARD STRUCTURE FOR VEHICLE SEAT LOCK

BACKGROUND OF THE INVENTION

1. Field of the Invention

The present invention relates to a guard structure employed in a vehicle seat lock for preventing a cable, used to connect between a seat locking mechanism and a key device adapted to be actuated by a key, from being forcibly operated from outside by the use of a tool.

2. Description of the Prior Art

In most motorcycles, a utility compartment and/or an electronic control appliance are disposed beneath a seat assembly and, therefore, the seat assembly is removably mounted on a vehicle body in order to enable access to the utility compartment and/or the electronic control appliance. In order to prevent the seat assembly from being removed by an unauthorized person having no key, the seat assembly is mounted on the vehicle body through a seat locking mechanism. Upon turn of a key inserted into a key device, the seat locking mechanism can be unlocked through a cable. See, for example, the Japanese Laid-open Patent Publication No. 2004 -11257 , published Jan. 15, 2003.

However, the conventional seat locking mechanism has a problem that if a person having no key inserts an elongated flexible tool such as a wire through a gap present around the key device or the cable to hitch the cable, the sheet locking mechanism can be unlocked.

SUMMARY OF THE INVENTION

The present invention has been made to substantially eliminate the foregoing problems and inconveniences inherent in the conventional vehicle seat lock and is intended to provide a guard structure for the vehicle seat lock, which is effective to prevent a seat locking mechanism from being unlocked without turn of a key.

In order to accomplish the foregoing object of the present invention, there is provided a guard structure for a vehicle seat lock, which includes a cable operatively connecting between a seat locking mechanism for a vehicle seat and a key device adapted to be actuated by a key. The guard structure further includes a guard body for blocking an access from outside of a vehicle body to the cable. It is to be noted that the term "vehicle body" used hereinabove and hereinafter is intended to encompass a motor vehicle structure including a vehicle frame structure and a mechanical skeleton of the vehicle fixed on the vehicle frame such as a fairing, side covers and a tail cover.

According to the present invention, even if an attempt is made to insert a tool such as a wire through a gap present around the key device or the cable so as to make access to the cable, this tool can be barred by the guard body and is therefore blocked from reaching the cable. Because of this, it is possible to prevent the seat locking mechanism from being unexpectedly unlocked by an unauthorized person having no key.

Preferably, the guard structure of the present invention also includes a support bracket, through which the key device is mounted on the vehicle body, and wherein the guard body is provided in the support bracket. According to this structural feature, the guard body can effectively block an access from outside to the cable since an area around the support bracket, where the cable is coupled with the key device but access from outside can be made easily, can be closed by the guard body. Also, no variation occur in the mounting position of the guard body, compared with the case in which the support bracket and the guard body are arranged separately, and, accordingly, not only can the access to the cable 54 be effectively blocked, but also the number of component parts used can be reduced if the guard body is formed integrally with the support bracket.

In one preferred embodiment of the present invention, the key device may be fitted to a tail cover positioned proximate to the vehicle seat. According to this structural feature, if the key device is fitted to the tail cover, the spacing between the key device and the sheet locking mechanism can be reduced and the cable can have a correspondingly reduced length, making it possible to allow the guard body to facilitate blocking of the access from outside to the cable.

Where the key device is fitted to the tail cover, the guard body is preferably provided in a rear fender positioned above a rear wheel. According to this structural feature, if the guard body is provided in the rear fender, which is a relatively large component forming the vehicle body, the guard body can have so large a size as to effectively block the access from outside to the cable.

In another preferred embodiment of the present invention, the guard body may be supported by a rear frame. According to this structural feature, in the case of, for example, a motor vehicle of a type, in which the key device is disposed at a location proximate to the rear frame, even if an attempt is made to insert the tool, for example, a wire through a gap present around the key device or the cable so as to make access to the cable, this tool can be barred by the guard body and is therefore blocked from reaching the cable.

In a further preferred embodiment of the present invention, the guard body may be one of vehicle mounted component parts, in which case the guard body is supported by the rear frame through a bracket. The term "vehicle mounted component parts" is intended to mean component parts mounted on the vehicle body which include, for example, electronic control component parts, accessories, clamps, indicators or any other ancillary part. According to this structural feature, since intrusion of the tool such as a wire can be blocked merely by changing the position of the vehicle mounted component part, it is possible to effectively prevent the seat locking mechanism from being unlocked with an inexpensive simplified structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, the present invention will be described in detail in connection with preferred embodiments thereof with reference to the accompanying drawings.

Figure 1:
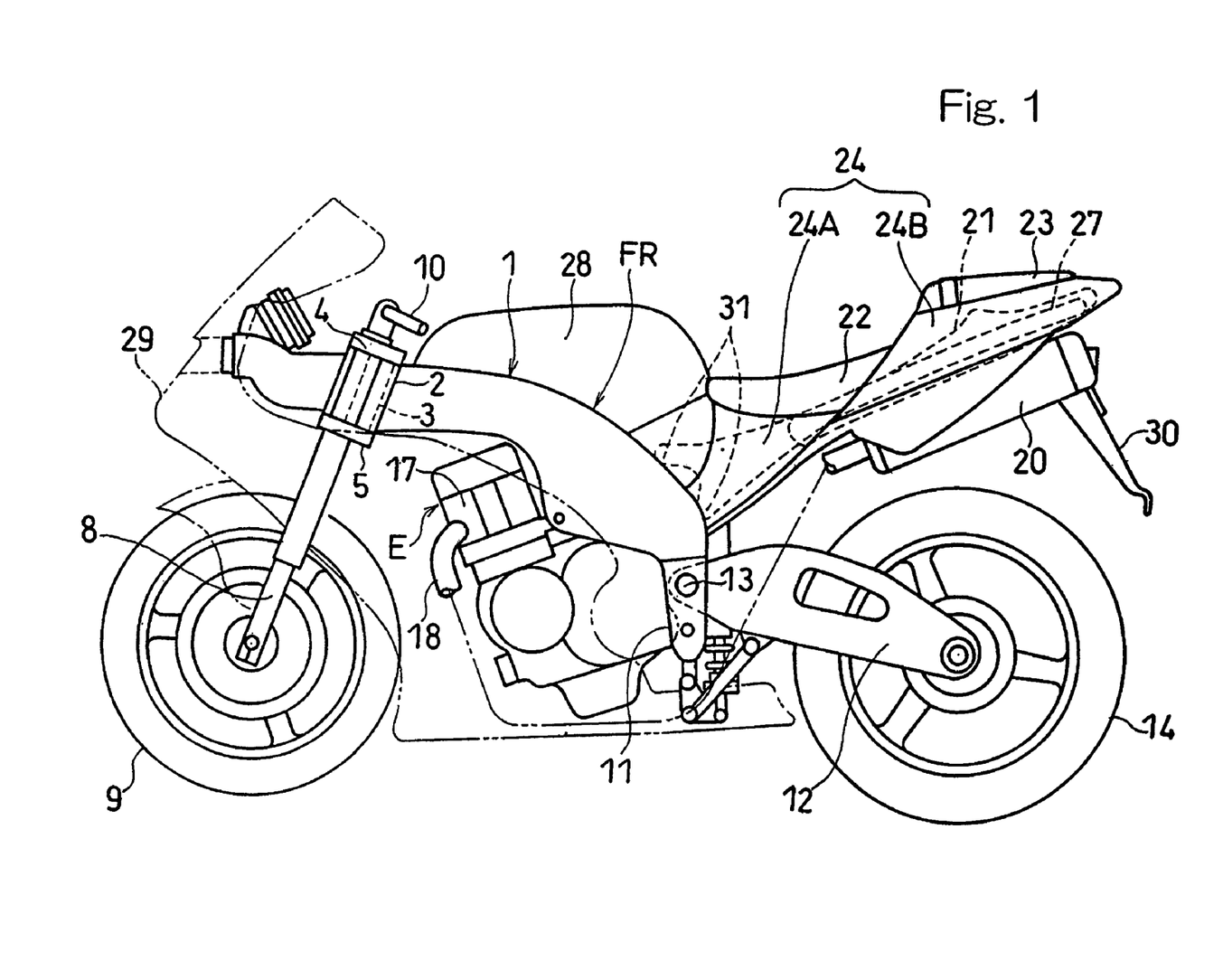
FIG. 1 is a schematic side view of a motorcycle equipped with a seat lock guard structure according to a first preferred embodiment of the present invention.

Referring to FIG. 1, showing a side view of a motorcycle equipped with a seat lock guard structure according to a first preferred embodiment of the present invention, the motorcycle shown therein includes a main frame 1 forming a front half of a motorcycle frame structure FR, a head tube 2 fitted to a front portion of the main frame 1, a steering shaft 3 rotatably inserted into the head tube 2, upper and lower brackets 4 and 5 supported to the head tube 2 through the steering shaft 3, front fork members 8 supported by the upper and lower brackets 4 and 5, and a front wheel 9 supported rotatably by respective lower ends of the front fork members 8. A handlebar 10 is mounted on the upper bracket 4 at respective upper ends of the front fork members 8.

Swingarm brackets 11 are provided at a rear lower portion of the main frame 1, and a swingarm 12 is pivotally supported by the swingarm brackets 11 through a pivot shaft 13 for vertical swing movement. A rear drive wheel 14 is rotatably carried by the swingarm 12. A multi-cylinder type engine E is supported at a position below an intermediate portion of the main frame 1. Also, a plurality of exhaust pipes 18 are fluidly connected with a cylinder head 17 of the engine E and are then fluidly connected with a muffler 20 disposed on each side of a rear portion of the motorcycle frame structure FR.

A rear frame 21 (seat rail assembly) rigidly coupled with a rear portion of the main frame 1 forms a rear half of the motorcycle frame structure FR. A rider's seat 22 and a fellow passenger's seat 23 are mounted on the rear frame 21. The rear frame 21 includes a rear wheel fender 27 positioned above the rear drive wheel 14. A fuel tank 28 is mounted on an upper portion of the main frame 1, or an upper portion of the motorcycle frame structure FR and between the handlebar 10 and the rider's seat 22. A fairing 29 made of a synthetic resin is fixedly mounted on a front end of the motorcycle frame structure FR to cover a front to side region of the motorcycle frame structure FR, including a front area forwardly of the handlebar 10 and side areas generally laterally of the motorcycle engine E,.

Figure 2:
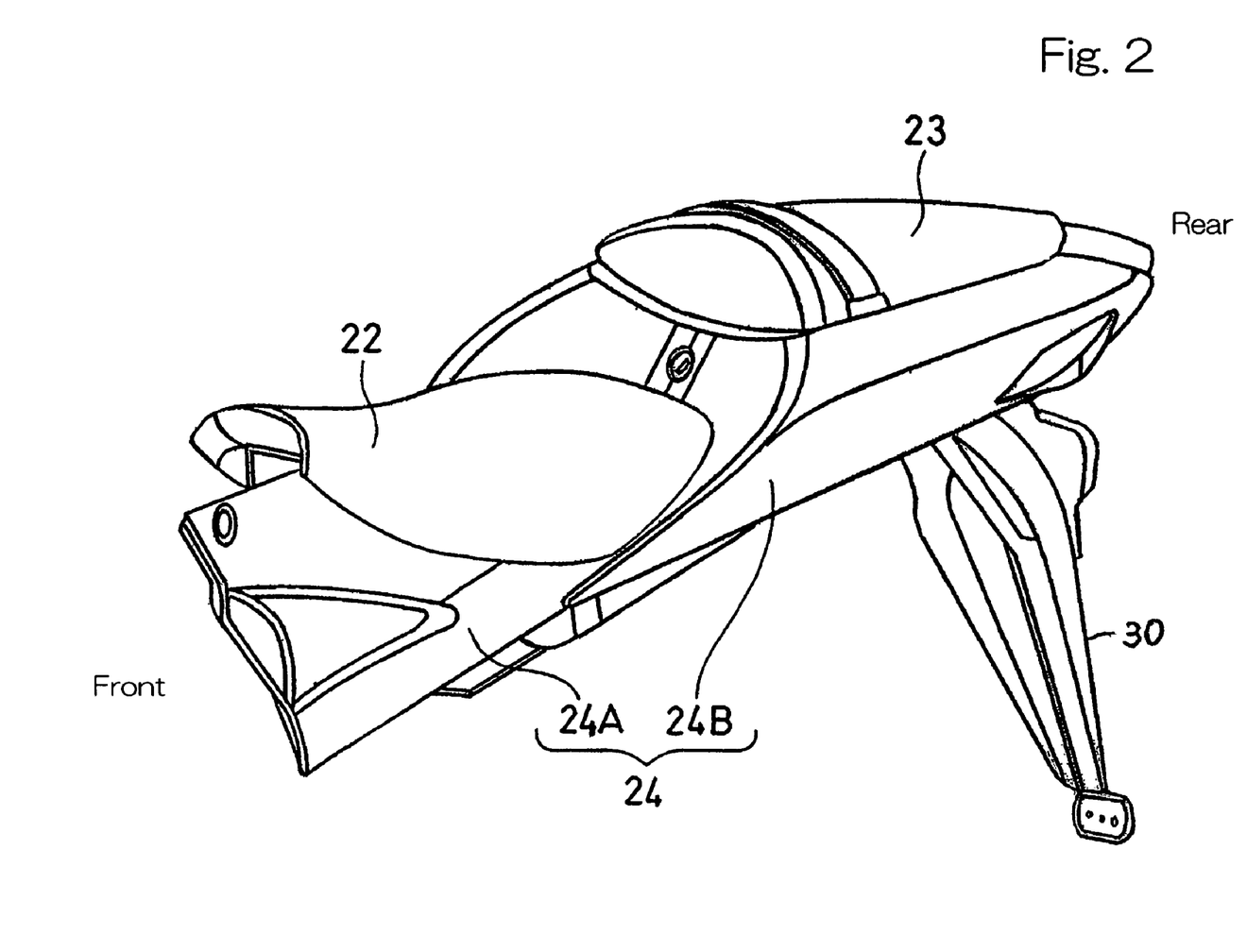
FIG. 2 is a perspective view of a seat mounting area of the motorcycle as viewed from front.

Except for the areas of the rear frame 21, where the rider's seat 22 and the fellow passenger's seat 23 are disposed, a part of opposite lateral areas of the rear frame 21 is covered by a front cover 24A while the remaining part of the lateral areas and a tail area of the rear frame 21 is covered by a rear cover 24B. The front cover 24A and the rear cover 24B form respective parts of a tail cover 24. A wheel fender flap 30 is connected with a rear lower portion of the rear wheel fender 27 so as to extend rearwardly downwardly therefrom to confront the rear wheel 14, thereby covering above and rearwardly of the rear wheel 14. In this condition, as shown in FIG. 2, the tail cover 24 is positioned in the vicinity of the rider's seat 22 and the fellow passenger's seat 23 (for example, below both the seats 22 and 23 in the illustrated instance).

Figure 3:
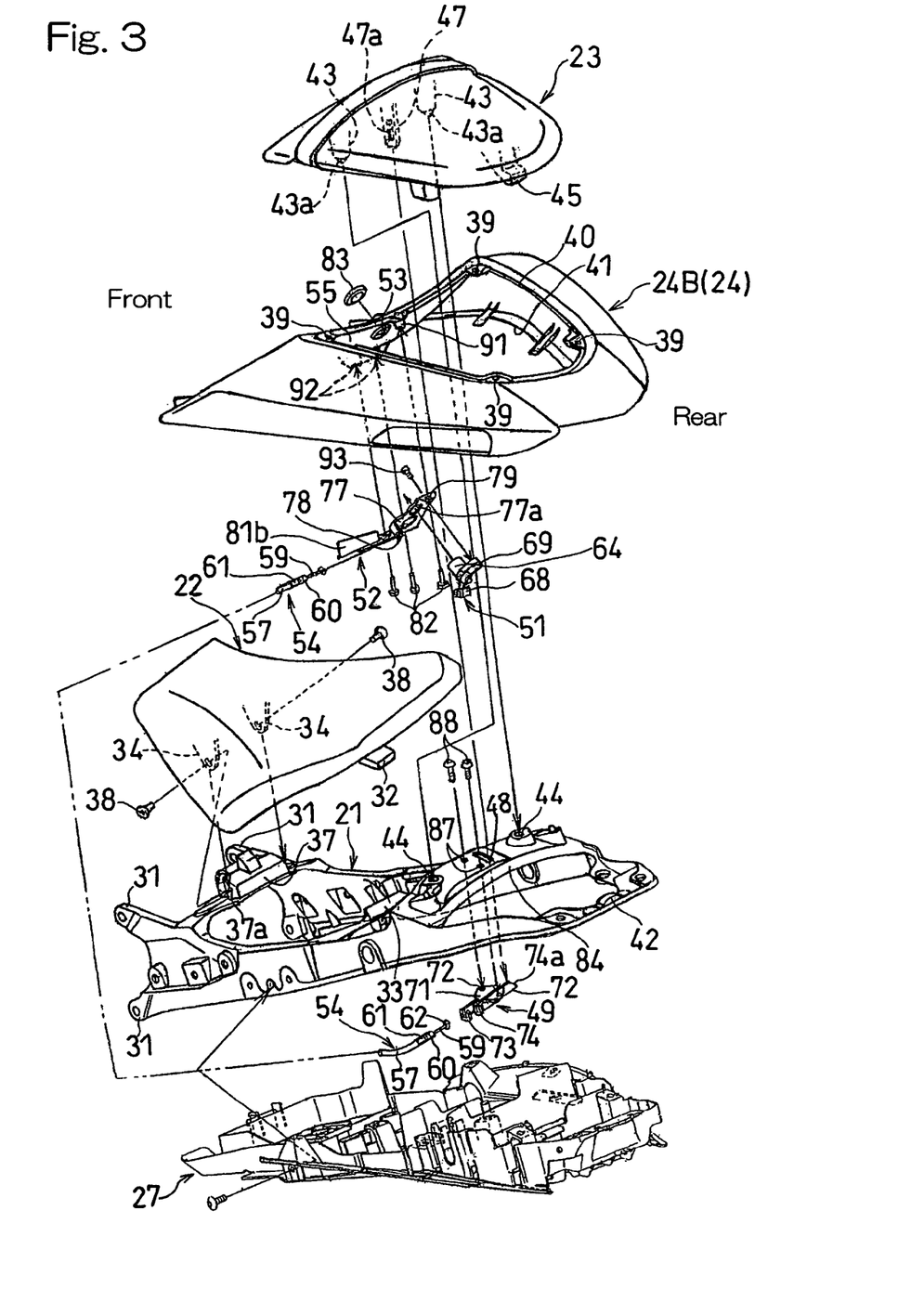
FIG. 3 is an exploded perspective view of the seat mounting area of FIG. 2 as viewed from rear.

Referring now to FIG. 3, showing an exploded view of FIG. 2, the rear frame 21 is made of a metallic material such as an aluminum alloy and is formed in a generally rectangular frame-like shape, when viewed from top. This rear frame 21 is formed at its front end with a plurality of, for example, four (although only three of them are shown) connecting pieces 31, through which the rear frame 21 is rigidly connected with the main frame 1 (shown in FIG. 1) by means of corresponding screw members (not shown) to extend rearwardly from the main frame 1.

The rider's seat 22 has an engagement pawl 32 protruding rearwardly therefrom and engageable in a hook 33 defined in the rear frame 21 and also has a pair of mounting pieces 34 rigidly secured to an undersurface of a front portion of the rider's seat 22 for alignment with respective fitting screw holes 37a defined in left and right side portion of a seat mounting area 37 of the rear frame 21. After the engagement pawl 32 is engaged in the hook 33 in the rear frame 21 and the mounting pieces 34 are aligned with the fitting screw holes 37a, fixing screws 38 are threaded into the fitting screw holes 37a through respective insertion holes defined in the mounting pieces 34, fixing the rider's seat 22 to the rear frame 21. In other words, the rider's seat 22 can be removed easily from the rear frame 21 merely by undoing the fixing screws 38. The rear cover 24B has a lower opening 41 that is closed by the rear wheel fender 27.

The rear cover 24B of the tail cover 24 is fixed to the rear frame 21 by means of threaded engagements in four fixing holes 39 defined in the rear cover 24B, covering a rear half of the rear frame 21. A top opening 40 of a contour conforming to the outer contour of the fellow passenger's seat 23 is defined in an upper portion of the rear cover 24B. Thus, it will readily be seen that an utility compartment is formed below the fellow passenger's seat 23, having been delimited by the rear fender 27 defining a bottom surface of the compartment, the rear cover 24B defining side surfaces of the compartment and the top opening 40 defining an access opening to the compartment.

At a location rearwardly of the rider's seat 22, the fellow passenger's seat 23 is mounted on the rear frame 21 so as to close the top opening 40 of the rear cover 24B rigidly secured to the rear frame 21. For this purpose, the fellow passenger's seat 23 is provided with an engagement pawl 45 rigidly connected to an undersurface of a rear portion of the seat 23 and, also, provided with a pair of left and right positioning studs 43 protruding downwardly from an undersurface of a front portion of the seat 23 and having an engagement projection 43a protruding downwardly from each of the positioning studs 43. The fellow passenger's seat 23 is positioned relative to the rear frame 21 when the engagement pawl 45 is latched in a hook 42 of the rear frame 21 and the engagement projections 43a are engaged in corresponding boss holes 44 defined in the rear frame 21.

The fellow passenger's seat 23 is also provided with a single to-be-locked piece 47 having a lock hole 47a engageable with a slidable lock piece 74 forming a part of a seat locking mechanism 49 as will be described in detail later, which to-be-locked piece 47 is positioned intermediate between the positioning studs 43 and 43. Accordingly, when the fellow passenger's seat 23 is mounted on the rear frame 21 with the engagement pawl 45 latched in the hook 42 and also with the engagement projections 43a engaged in the boss holes 44 as described above, the to-be-locked piece 47 extends through a slit-shaped insertion hole 48, defined in the rear frame 21, and is engaged with the slidable locking piece 74. In this way, the fellow passenger's seat 23 is unremovably locked to the rear frame 21.

A key device 51 for locking and unlocking the seat locking mechanism 49 by a key to enable the fellow passenger's seat 23 to be removed from the rear frame 21 is fixedly inserted in a key mounting hole 53, defined in a front wall 55 of the rear cover 24B, through a support bracket 52. The key device 52 is operatively connected to the seat locking mechanism 49 through a cable 54. The details of the seat locking mechanism 49, the key device 51 and the cable 54 will now be described with particular reference to FIGS. 4 to 6.

Figure 4:
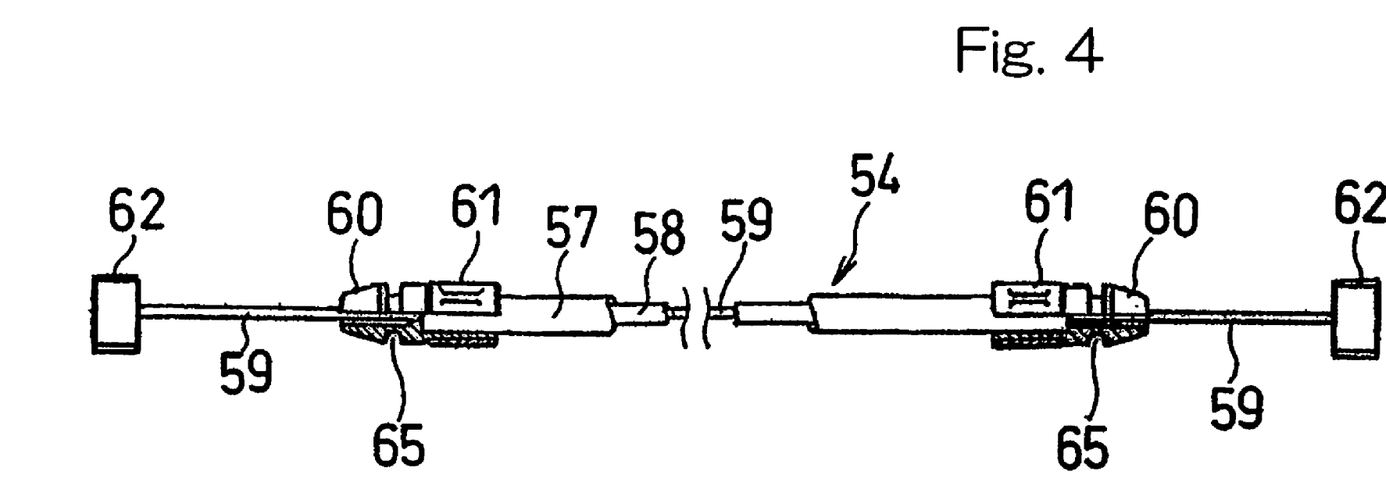
FIG. 4 is a fragmentary side view of a cable employed in the seat lock.

As shown in FIG. 4, the cable 54 includes a cable sheath 57, having a longitudinal hollow accommodating therein a tubular liner 58, and a cable wire 59 extending through the liner 58. The cable sheath 57 has its opposite ends each provided with a connecting member including a cap 60 and a clamp member 61 threadingly engaging the corresponding cap 60, with a circumferentially extending engagement groove 65 defined between the clamping member 61 and the cap 60. Opposite ends of the cable wire 59 protruding outwardly from the cable sheath 57 are provided rigidly with respective drum-shaped anchoring members 62.

Figure 5A:
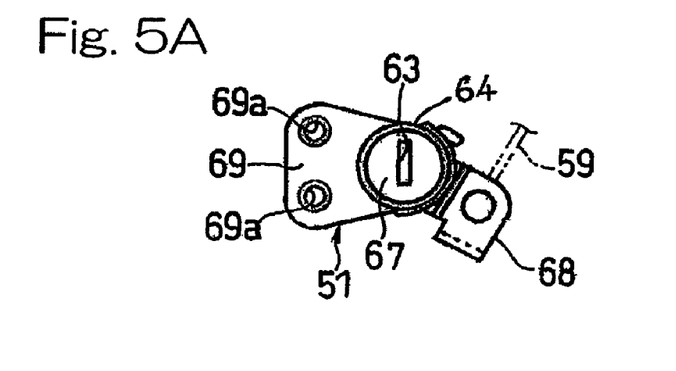
FIG. 5A is a front elevational view of a key device employed in the seat lock.
Figure 5B:
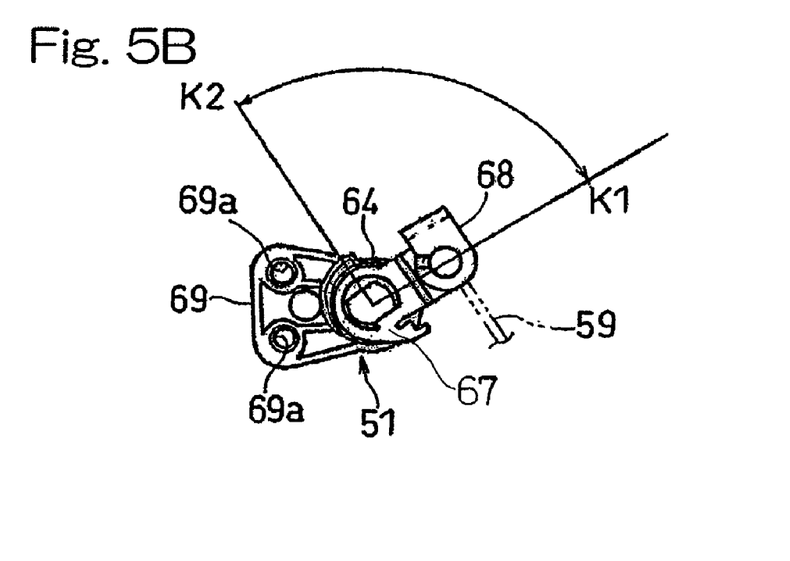
FIG. 5B is a rear elevational view of the key device.
Figure 5C:
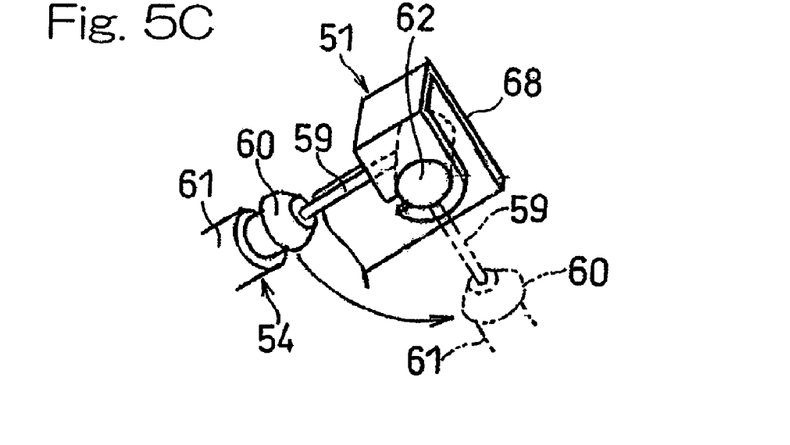
FIG. 5C is a perspective view of the key device, showing the manner of connecting of the cable to the seat lock.

The key device 51 is in the form of a rotary lock including, as shown in FIG. 5A in a front elevational view, a key body 64 having a key hole 63 on the front, and a key rotor 67 which is retained rotatably within the key body 64 but can be turned in response to turn of a key (not shown) inserted into the key hole 63. As shown in FIG. 5B in a rear view, a cable coupling piece 68 is connected with a rear surface of the key rotor 67 for rotation together therewith. As shown in FIG. 5C, one of the cable anchoring members 62 is engaged with the cable coupling piece 68 to connect the corresponding end of the cable 54 with the key device 51.

Also, as shown in FIG. 5B, the key body 64 is formed with a mounting plate 69, having two screw holes 69a defined therein, so as to protrude in a direction away from the cable coupling piece 68.

Figure 6A:
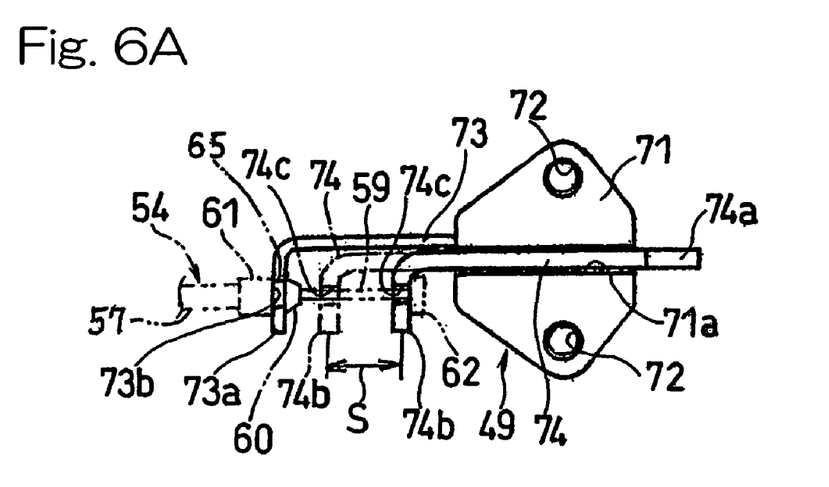
FIG. 6A is a plan view of a seat locking mechanism employed in the seat lock.
Figure 6B:
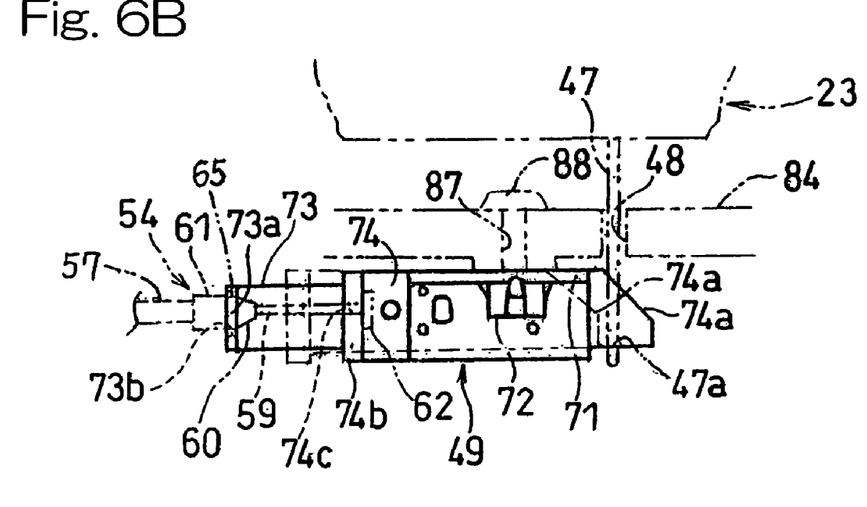
FIG. 6B is a front elevational view of the seat locking mechanism.

FIGS. 6A and 6B illustrate the seat lock mechanism 49 in plan and front elevational views, respectively. This seat lock mechanism 49 includes a mounting plate 71 adapted to be fixedly connected to the rear frame 21, two connecting nuts 72 rigidly secured to the mounting plate 71, a retaining piece 73 extending laterally outwardly from the mounting plate 71 with one end rigidly connected to the mounting plate 71, and a locking piece 74 slidably retained in a slide guide groove 71a defined in the mounting plate 71. One of opposite ends, i.e., a right end, of the locking piece 74 protruding outwardly from the mounting plate 71 is rendered to be a locking portion 74a having an inclined guide surface. The other of the opposite ends of the locking piece 74 is bent at right angles to define a retaining portion 74b having a cable wire mounting groove 74c opening upwardly. One of the cable anchoring members 62 of the cable 54 is coupled with the retaining portion 74b with the cable wire 59 passed through the cable wire mounting groove 74c.

On the other hand, the other end of the retaining piece 73 remote from the mounting plate 71 is bent at right angles to extend substantially parallel to the retaining portion 74b of the locking piece 74, defining a retaining portion 73a. The retaining portion 73a has a cable sheath mounting groove 73b opening upwardly. One of the cable caps 60 of the cable 54 is coupled with the retaining piece 73 with the groove 65 of the cable 54 engaged in the corresponding cable sheath mounting groove 73b.

Referring to FIG. 6B, when the cable wire 59 is pulled by turn of a key inserted into the key device 51, the locking piece 74 is moved from a seat locked position shown by a solid line, in which the locking portion 74a of the locking piece 74 is engaged in the lock hole 47a in the to-be-locked piece 47, towards a seat unlocked position shown by the phantom line, in which the locking portion 74a is disengaged out of the lock hole 47a. In this unlocked position, the fellow passenger's seat 23 (FIG. 3) is unlocked. With the fellow passenger's seat 23 unlocked, the fellow passenger's seat 23 can be removed from the motorcycle rear frame 21.

Figure 7:
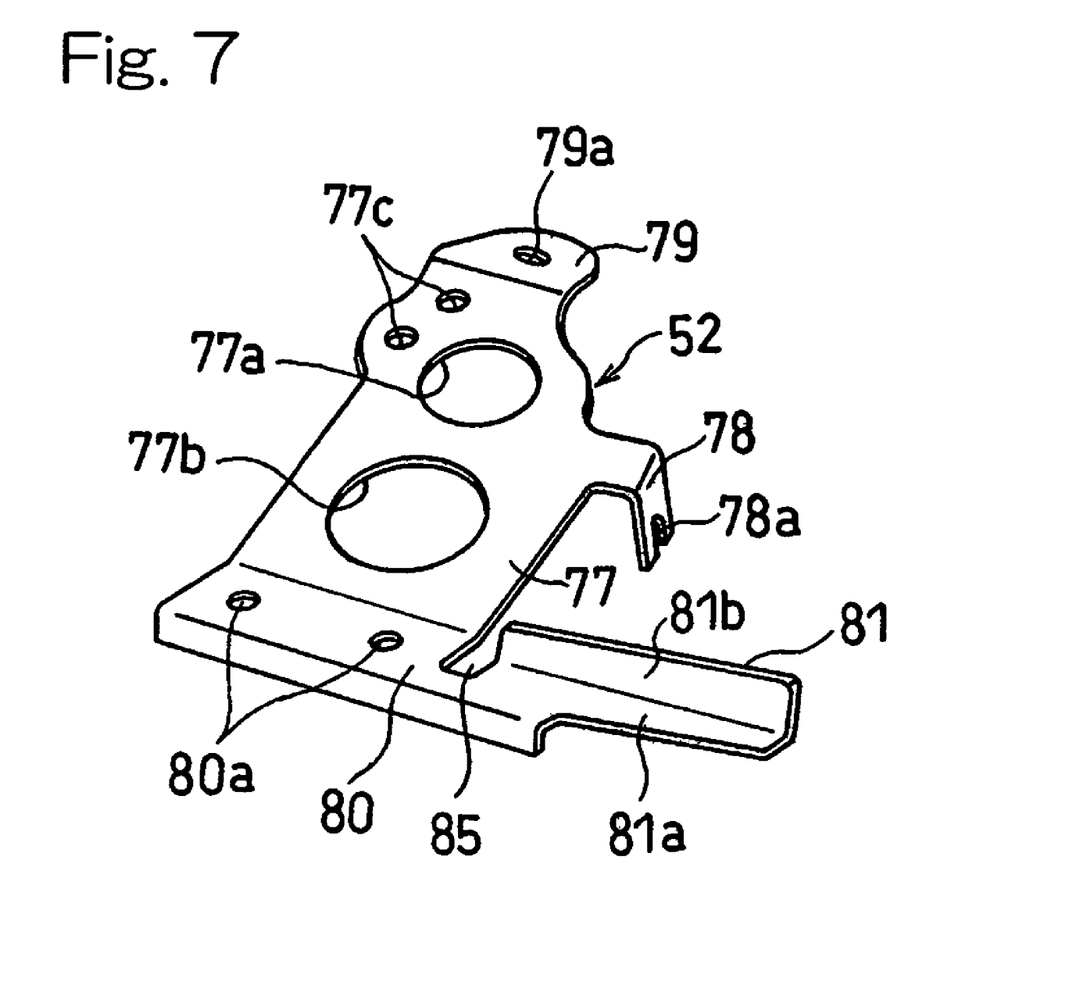
FIG. 7 is a perspective view of a support bracket for the key device.

Referring to FIG. 7, the support bracket 52 for supporting the key device 51 is made of a metallic material and is formed integrally with a body plate 77 having a key mounting hole 77a, a lightening hole 77b and a pair of mounting holes 77c all formed therein, a support piece 78 formed by bending one side portion of the body plate 77 at predetermined angles relative to the remaining portion of the body plate 77 and used to support the cable 54, two mounting pieces 79 and 80 formed by bending upper and lower end portions of the body plate 77 at right angles relative to the remaining portion of the body plate 77, and a guard piece 81 protruding laterally from the lower mounting piece 80 in a direction conforming to the support piece 78. The guard piece 81 forms a guard body of the present invention.

The support piece 78 is formed with a mounting groove 78a for engagement with the corresponding groove 65 of the cable 54 shown in FIG. 4. The guard piece 81 is made up of a retaining piece 81a, protruding from the lower mounting piece 80, and a guard portion 81b extending substantially vertically from the retaining piece 81a. The upper and lower mounting pieces 79 and 80 are formed with one mounting hole 79a and two mounting holes 80a, respectively.

Hereinafter, the manner of mounting the support bracket 52 (FIG. 7), the key device 51 (FIGS. 5A to 5C) and the seat locking mechanism 49 (FIGS. 6A and 6B) will be described in detail. In the first place, one end of the cable 54 is connected to the support bracket 52 and the key device 51. More specifically, one end of the cable wire 59 of the cable 54 is connected to the cable coupling piece 68 of the key device 51 in the manner described with reference to FIGS. 5A to 5C. One end of the cable sheath 57 of the cable 54 is passed through and fixed in the mounting groove 78a of the support piece 78 in the support bracket 52 shown in FIG. 7.

After, as shown by the arrow in FIG. 3, the key body 64 of the key device 51 is passed through the key mounting hole 77a in the support bracket 52, fixing screws 93 are then passed respectively through the two mounting holes 77c (FIG. 7) in the support bracket 52 and are then threaded into the associated screw holes 69a in the key device 51 to connect the key device 51 to the support bracket 52.

Thereafter, the key body 64 protruding forwardly from the key mounting hole 77a in the support bracket 52 is passed through the key mounting hole 53 in the rear cover 24B from inside of the rear cover 24B and, while the body plate 77 of the support bracket 52 is held in abutment with an inner surface of the front wall 55 of the rear cover 24B, fixing screws 82 are, after the mounting holes 79a and 80a in the mounting pieces 79 and 80 of the support bracket 52 shown in FIG. 7 have been aligned with respective fixing nut portions 91 and 92 protruding outwardly from the front wall 55 of the rear cover 24B, threaded into the fixing nuts 91 and 92 through the mounting holes 79a and 80a. By so doing, the support bracket 52 is fixed to the inner surface of the front wall 55 of the rear cover 24B. A fixing ring 83 (FIG. 3) is mounted on a free end of the key body 64, which protrudes outwardly from the key mounting hole 53 in the rear cover 24B, to improve the outer appearance.

Prior to the mounting of the seat locking mechanism 49, the retaining piece 73 of the seat locking mechanism 49 is connected to the opposite end of the cable sheath 57 through the corresponding cable cap 60 while the locking piece 74 is connected to the opposite end of the cable wire 59 in the manner described with particular reference to FIGS. 6A and 6B. On the other hand, as shown in FIG. 3, a bridge portion 84 provided in the rear half of the rear frame 21 is formed, in addition to the boss holes 44 and the slit-shaped insertion hole 48, with a pair of insertion holes 87. After the opposite end of the cable 54 has been connected to the seat locking mechanism 49, the seat locking mechanism 49 is fixed to the bridge portion 84 of the rear frame 21 by holding the mounting plate 71 of the seat locking mechanism 49 in abutment with an undersurface of the bridge portion 84, aligning the connecting nuts 72 with the respective insertion holes 87 of the bridge portion 84 and screwing fixing screws 88 into the connecting nuts 72 through the insertion holes 87.

When the fellow passenger's seat 23 is mounted onto the rear frame 21, the free end of the to-be-locked piece 47 of the seat 23, then moving downwardly in a direction towards the rear frame 21, slides along the inclined guide surface of the locking portion 74a of the locking piece 74 while urging the locking piece 74 to move a stroke S backwardly to a position shown by the phantom line in FIG. 6A. Once the locking piece 74 is so moved backwardly, the locking piece 74 is, by the action of a pushing force exerted by the cable wire 59 of the cable 54, driven in a direction counter to the direction of backward movement until the locking portion 74a of the locking piece 74 is inserted into and then engaged in the locking hole 47a in the to-be-locked piece 47 to establish the seat locked position, in which the fellow passenger's seat 23 is locked to the rear frame 21.

On the other hand, when the fellow passenger's seat 23 is desired to be released, a key has to be inserted into the key hole 63 of the key device 51 and then turned. When the key is turned, the key rotor 67 of the key device 51 is turned from a seat lock position K1, shown in FIG. 5B, to a lock release position K2, accompanied by a corresponding turn of the cable coupling piece 68 about the longitudinal axis of the key rotor 67. Once the cable coupling piece 68 is so turned, the cable wire 59 of the cable 54 is pulled, accompanied by movement of the slidable lock piece 74 of the seat locking mechanism 49 to a lock release position shown by the phantom line in FIG. 6B to thereby allow the fellow passenger's seat 23 to be unlocked.

Figure 8:
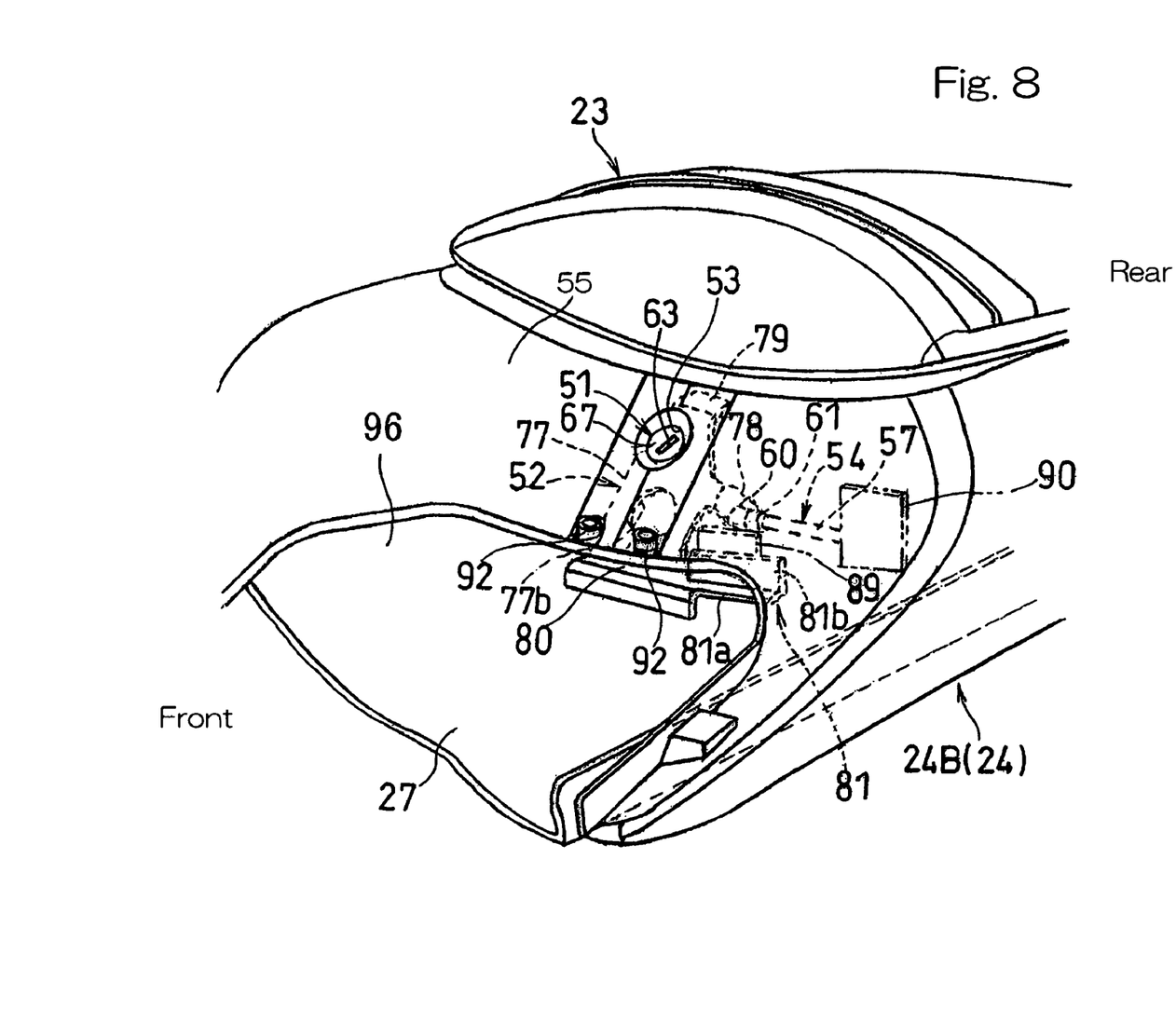
FIG. 8 is a fragmentary perspective view of a rear portion of the motorcycle with a motorcycle rider's seat removed, as viewed from front right side.
Figure 9:
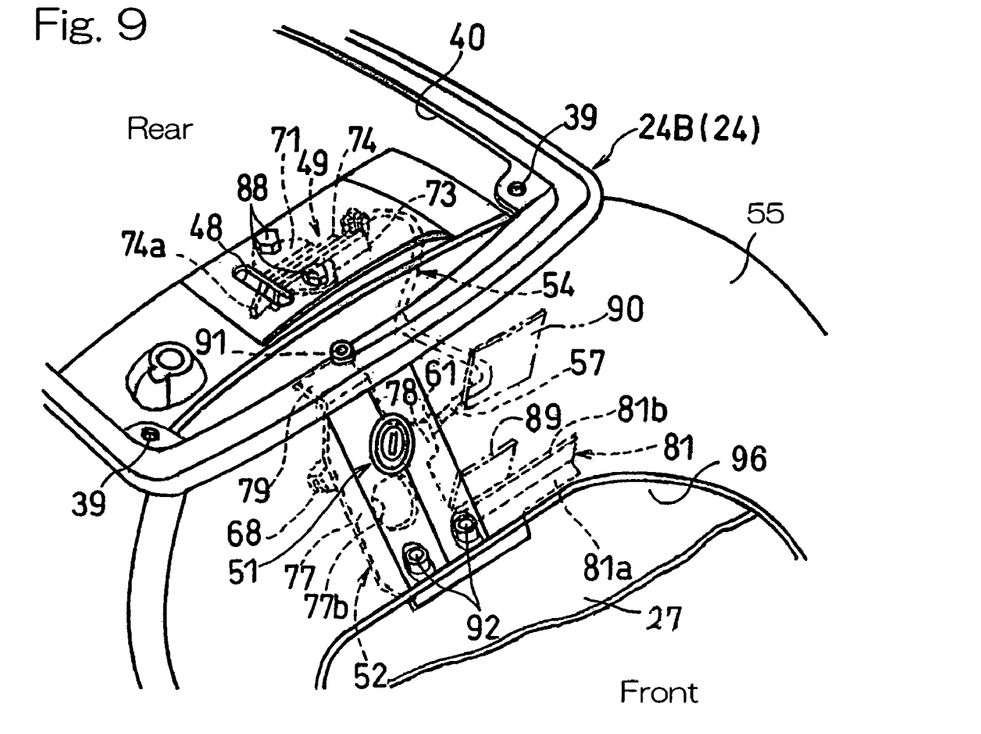
FIG. 9 is a fragmentary perspective view of a rear portion of the motorcycle with the rider's seat and a fellow passenger's seat removed, as viewed from front left side.

As shown in FIGS. 8 and 9, the rear fender 27 positioned beneath the rear cover 24B is formed integrally with a first guard plate 89, employed as an additional guard body and positioned rearwardly of the guard piece 81 of the support bracket 52 forming a part of the key device 51, and a second guard plate 90 employed as an additional guard body and positioned rearwardly of the first guard plate 89 and forwardly of the cable 54. Each of the guard plates 89 and 90 is in the form of an upright wall rising from the rear fender 27. The first guard plate 89 blocks a tool that is inserted through a gap 85 delimited between the body plate 77 and the guard portion 81b of the support bracket 52 shown in FIG. 7, to thereby prevent the tool from being further advanced. On the other hand, the second guard plate 90 blocks a tool that is inserted towards the guard piece 81 from front and then advanced beneath or laterally of the guard piece 81 towards the inside of the rear cover 24B, to thereby prevent the tool from being further advanced.

It is, however, to be noted that in the practice of the present invention, one or both of the first and second guard plates 89 and 90 may be dispensed with.

When the rider's seat 22 shown in FIG. 2 is removed, a portion of the rear cover 24B, where the rider's seat 22 is mounted, is opened as shown in FIG. 8, with an opening 96 exposed to the outside. In this condition, a large gap exists between a lower portion of the rear cover 24B and the rear fender 27. Even if an attempt is made to unlock the fellow passenger's seat 23 by inserting an elongated flexible tool such as a wire into a space in the lower portion of the rear cover 24B through the opening 96 until the tip of the tool hitches the cable 54 and then by pulling the inserted tool together with the cable 54, the tool can be brought into contact with the upright guard portion 81b of the guard piece 81 in the support bracket 52, thereby preventing the elongated tool from reaching the cable 54.

According to the foregoing embodiment, an access from the outside of the vehicle body to the cable 54 can be effectively barred since the guard piece 81 serves to block an easy-to-access area adjacent the support bracket 52, where the cable 54 is arranged to be coupled with the key device 51. Also, since the guard piece 81 is formed integrally with the support bracket 52, no variation occur in the mounting position of the guard piece 81, compared with the case in which the support bracket 52 and the guard piece 81 are arranged separately, and, accordingly, not only can the access to the cable 54 be effectively avoided, but also the number of component parts used can be reduced. Also, even though the tool is inserted from anywhere and any direction, the access of the tool to the cable 54 can be effectively prevented by the presence of the first and second guard plates 89 and 90 provided in the rear fender 27.

Considering that the key device 51 is fixedly fitted to the front wall of the rear cover 24B of the tail cover 24 and substantially intermediate of the width of the vehicle body, the cable 54 extending between the key device 51 and the seat locking mechanism 49, both shown in FIG. 9, can have a reduced length and, consequently, even if the number of the guard plates 89 and 90 that are provided in the rear fender 27 can be reduced, the access of the tool to the cable 54 can be barred with a simplified construction. In the illustrated instance, the cable 54 is accommodated within an interior space defined by the rear fender 27, the rear cover 24B of the tail cover 24 and the fellow passenger's seat 23.

It is to be noted that one of the guard piece 81 and the guard plates 89 and 90 may be dispensed with and, where the guard piece 81 is not employed, the first guard plate 89 is preferably arranged in the vicinity of the opening 96.

Figure 10:
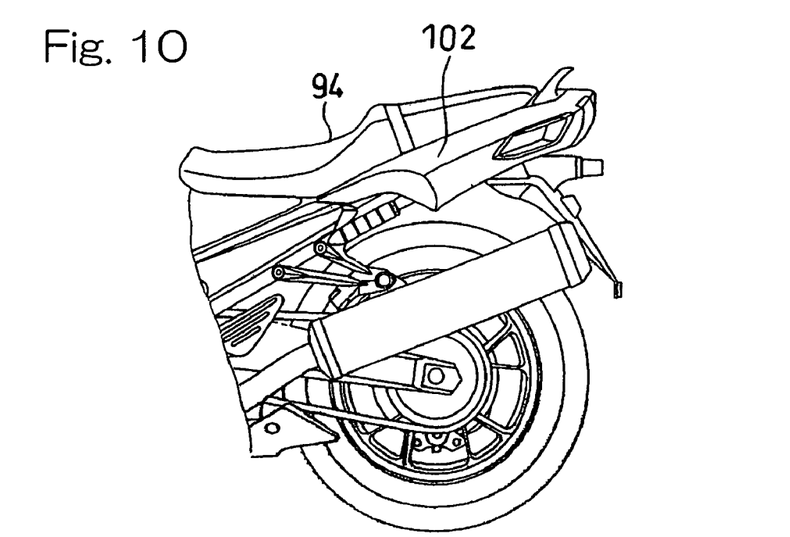
FIG. 10 is a fragmentary side view of a rear portion of the motorcycle equipped with the seat lock guard structure according to a second preferred embodiment of the present invention.
Figure 11:
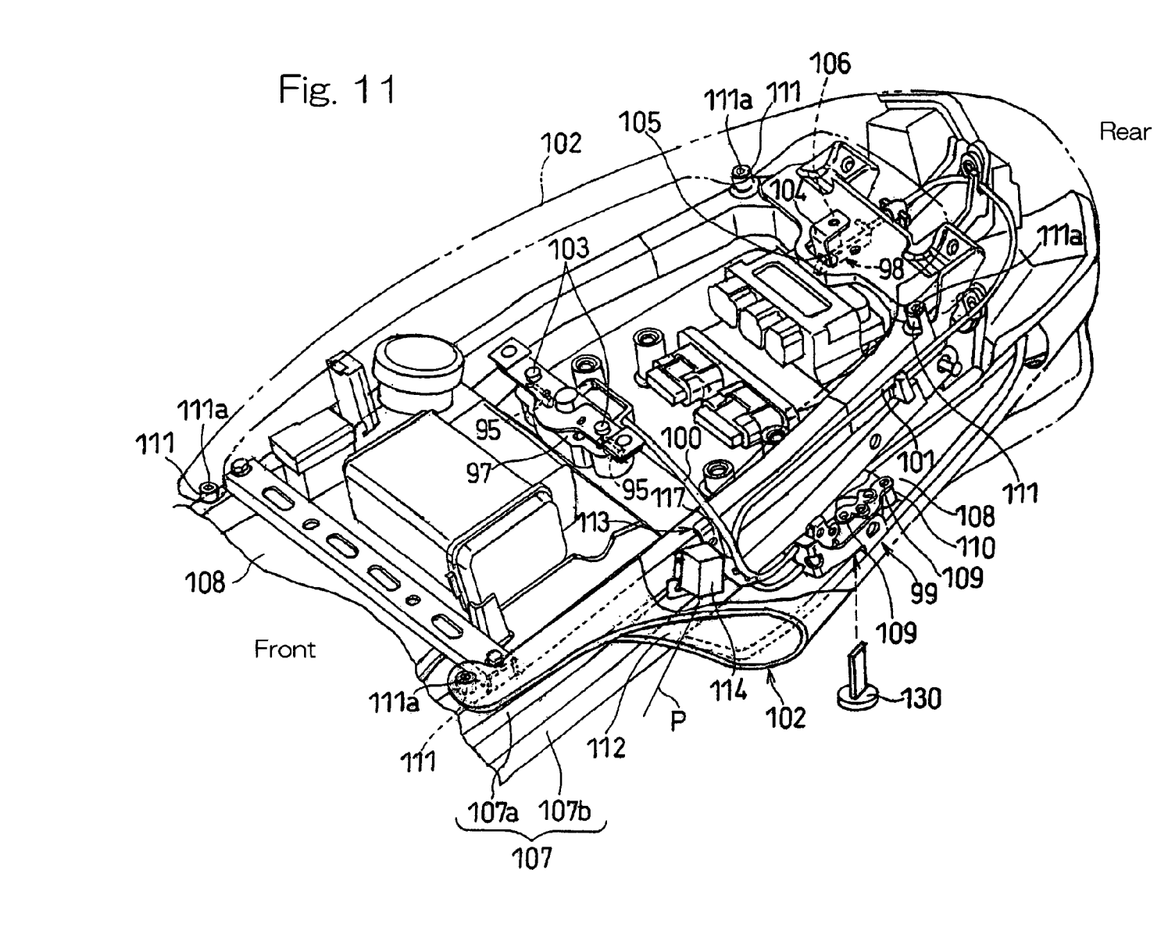
FIG. 11 is a perspective view of the seat lock guard structure employed in the motorcycle shown in FIG. 10.
Figure 12:
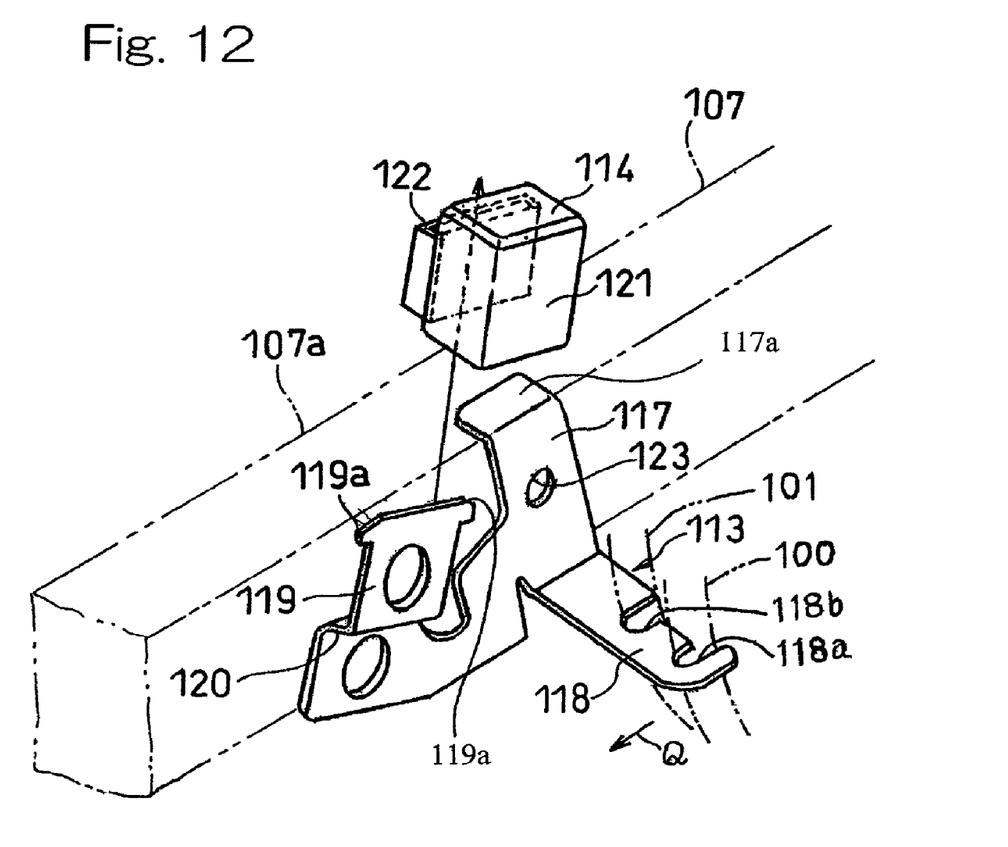
FIG. 12 is an exploded perspective view showing a motorcycle mounted component and a bracket, both used in the seat lock guard structure.

FIGS. 10 to 12 illustrate a second preferred embodiment of the present invention. In particular, FIG. 10 illustrates a fragmentary side view showing a rear portion of the vehicle body equipped with the guard structure for the seat lock. The motorcycle shown therein makes use of a unitary seat structure 94, in which the rider's seat and the fellow passenger's seat are formed integrally with each other.

The unitary seat structure 94 is generally elongated in a longitudinal direction of the vehicle body and, therefore, the use is made of a double lock device including, as shown in Fig. 11, a front seat locking mechanism 97 and a rear seat locking mechanism 98 to lock the unitary seat structure 94. The front seat locking mechanism 97 is of a twin type, in which projections of a slider 95 slidable in a direction transverse of the front seat locking mechanism 97 can be engaged in respective recesses defined in corresponding two lock pins 103 fixed in downward orientation to the unitary seat structure 94 (FIG. 10).

On the other hand, the rear seat locking mechanism 98 is of a type substantially identical with the seat locking mechanism 49 shown in FIG. 3 and employed in the practice of the first embodiment of the present invention and is used to lock the unitary seat structure 94 when a slider 106 movable in the longitudinal direction of the vehicle body is engaged in a lock hole 105 defined in a to-be-locked piece 104 fixed in downward orientation to the seat structure 94.

The front and rear seat locking mechanism 97 and 98 are operated through respective cables 100 and 101 by inserting a key into the sole key device 99. For this purpose, the key device 99 is arranged at a location generally intermediate between the front and rear locking mechanisms 97 and 98 and rigidly secured to the rear fender 108. More specifically, the key device 99 is fixed to the rear fender 108 by aligning two fixing holes 109 of the key device 99 with respective boss holes (not shown) defined in bosses 110 of the rear fender 108 and then by screwing corresponding tapping screws (not shown) into those boss holes. A key hole (not shown) of the sole key device 99 is so oriented downwardly that the presence of the key hole cannot be recognized by any person other than the rider of the motorcycle. Therefore, a key 130 can be inserted into the key hole from below in a direction, shown by the arrow-headed broken line.

The rear frame 107 includes an upper frame member 107a and a lower frame member 107b positioned one above the other. The rear fender 108 is fixed to the rear frame 107 by means of screws. A tail cover 102 is fixed to the upper frame member 107a of the rear frame 107 by means of bolts threaded into respective rubber nuts (not shown) which are plugged in four boss holes 111a in four corresponding bosses 111 provided in the rear frame 107. This tail cover 102 is of a shape turned backwards at a lower portion thereof so that the key device 99, the cables 100 and 101 and the neighborhood of the key device 99 can be concealed, and an opening 112 is defined at front end thereof. For this reason, a tool such as a wire can be inserted from outside of the vehicle body through the opening 112.

In view of the above, in order to avoid an insertion of the tool, a bracket 113 supporting the two cables 100 and 101 is arranged forwardly of and close to the key device 99, and a lamp relay 114 for actuating direction indicating blinkers one at a time is fixedly mounted on this bracket 113. Accordingly, the lamp relay 114, which is one of vehicle mounted component parts, is utilized to serve as a guard body for blocking an access to the cables 100 and 101 from outside.

As shown in FIG. 12, the bracket 113 is prepared from a sheet metal by the use of any known press work and is formed integrally with a fixing piece 117 to be secured to the rear frame 107, a support piece 118 for supporting the cables 100 and 101 and a mounting piece 119 on which the lamp relay 114 is mounted. The support piece 118 has a pair of support grooves 118a and 118b of a substantially U-shaped configuration opening rearwardly, in which grooves 118a and 118b the cables 100 and 101 are engaged, respectively. The fixing piece 117 has an upper end that is bent to extend inwardly to define a detent pawl 117a. The mounting piece 119 includes a pair of engagement pawls 119a protruding from opposite sides of an upper end of the mounting piece 119 and a bent portion 120 at a lower end thereof. The mounting piece 119 protrudes slightly laterally of the upper frame member 107a through the bent portion 120.

On the other hand, the lamp relay 114 includes a relay body inserted into a protective casing 121 made of a rubber material, which casing 121 is formed at its inner side with a slit 122 for insertion of the mounting piece 119 of the bracket 113. Accordingly, the protective casing 121 is supported by the mounting piece 119 while seated on the bent portion 120, when the mounting piece 119 is inserted into the slit 122 with the engagement pawls 119a engaged non-detachably with an upper edge portion of the slit 122. The bracket 113 is secured to the upper frame member 107a when, after the detent pawl 117a of the fixing piece 117 has been brought into abutment with an upper surface of the upper frame member 107a to prevent the bracket 113 from rotating and a fixing hole 123 defined in the fixing piece 117 has been aligned with a mounting hole (not shown) defined in the upper frame member 107a of the rear frame 107, a set screw (not shown) is threaded into a pop-nut (also not shown) inserted in the mounting hole of the upper frame member 107a.

In this guard structure described above, when an attempt is made to insert the tool such as a wire is inserted through the opening 112 in the tail cover 102 towards the cables 100 and 101 as shown by the arrow-headed solid line P in FIG. 11, the tool is blocked by the lamp relay 114 and, hence, cannot reach the cables 100 and 101. Also, even when the cables 100 and 101 are pulled forwards (outwardly) by the tool in a direction shown by the arrow Q in FIG. 12, further forward pull of the cables 100 and 101 can be blocked by the support piece 118. Moreover, with this guard structure, merely by changing the position of the lamp relay 114, intrusion of the tool can be prevented by the lamp relay 114 to avoid an unnecessary unlocking with an inexpensive simplified structure.

It is to be noted that in place of the lamp relay 114 used as the guard body, a guard piece similar to the guard piece 81 shown in FIG. 7 and described in connection with the first embodiment may be formed integrally with or rigidly connected with the bracket 113.

It is also to be noted that the support bracket 52 shown in FIG. 7 and described in connection with the first embodiment and the bracket 113 shown in FIG. 12 and described in connection with the second embodiment may not be made of a metallic material as described, but may be made of a synthetic resin.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, the guard structure for the seat lock according to the present invention, although having been shown and described as applied to the motorcycle, can be equally applied to, for example, a three-wheeled motor vehicle or a four-wheeled off-road motor vehicle.

Accordingly, such changes and modifications are, unless they depart from the scope of the present invention as delivered from the claims annexed hereto, to be construed as included therein.

What is claimed is:

1. A guard structure for a seat lock on a vehicle having a frame structure supporting an exterior vehicle body with a seat member movably mounted on the exterior vehicle body and closing access to a compartment within the vehicle body, comprising:
  a seat locking mechanism for locking and unlocking the seat member to the exterior of the vehicle body;
  a cable operatively connected to the seat locking mechanism for moving the seat locking mechanism between an unlocked to a locked state;
  a key device mounted to be accessible through the exterior vehicle body apart from the seat locking mechanism and operatively connected to move the cable;
  a key member for activating the key device to move the cable; and
  means for mounting the key device within the vehicle body including a guard body means, positioned to block intrusion of a foreign object between an interface of the exterior vehicle body and an opening of the compartment closed by the seat member, for protecting the cable from being contacted by the foreign object, and wherein the guard body is a lamp relay for activating directional blinkers.

2. A guard structure for a seat lock on a vehicle having a frame structure supporting an exterior vehicle body with a seat member movably mounted on the exterior vehicle body and closing access to a compartment within the vehicle body, comprising:
  a seat locking mechanism for locking and unlocking the seat member to the exterior of the vehicle body;
  a cable operatively connected to the seat locking mechanism for moving the seat locking mechanism between an unlocked to a locked state;
  a key device mounted to be accessible through the exterior vehicle body apart from the seat locking mechanism and operatively connected to move the cable;
  a key member for activating the key device to move the cable;
  a guard body means, positioned to block intrusion of a foreign object between an interface of the exterior vehicle body and an opening of the compartment closed by the seat member, for protecting the cable from being contacted by the foreign object; and
  means for mounting the key device within the vehicle body, wherein the guard body means is provided in the means for mounting the key device.

3. The guard structure of claim 2 wherein the guard body means for protecting the cable further provides a separate operative function for the operation of the vehicle.

4. The guard structure of claim 3 wherein the guard body is a lamp relay for activating directional blinkers.

5. A guard structure for a seat lock of a vehicle, which comprises:
  a seat locking mechanism for a vehicle seat, the seat locking mechanism being fitted to a rear frame of a vehicle frame structure;
  a key device adapted to be actuated by a key;
  a support bracket, through which the key device is mounted on the vehicle;
  a cable operatively connecting between the seat lock mechanism and the key device; and
  a guard body for blocking an access from outside of a vehicle body to the cable, wherein the key device is fitted to a tail cover, positioned proximate to the vehicle seat and covering the rear frame, and
  wherein the guard body is provided in the support bracket and is a separated part from the tail cover and blocks an access through a gap around the tail cover to the cable.

6. The guard structure for the seat lock as claimed in claim 5, wherein the guard body is provided in a rear fender positioned above a rear wheel of the vehicle.

7. The guard structure for the seat lock as claimed in claim 5, wherein the guard body is supported by the rear frame of the vehicle.

8. The guard structure for the seat lock as claimed in claim 7, wherein the guard body is one of vehicle mounted component parts and is supported by the rear frame through the support bracket.

9. The guard structure for the seat lock as claimed in claim 5 wherein the guard body provides a separate operative function in an operation of the vehicle.

10. The guard structure for the seat lock as claimed in claim 9 wherein the guard body is a lamp relay for activating directional blinkers.

11. A guard structure for a seat lock of a vehicle, which comprises:
  a seat locking mechanism for a vehicle seat, the seat locking mechanism being fitted to a rear frame of a vehicle frame structure;
  a key device adapted to be actuated by a key;
  a cable operatively connecting between the seat lock mechanism and the key device; and
  a guard body for blocking an access from outside of a vehicle body to the cable, wherein the key device is fitted to a tail cover, positioned proximate to the vehicle seat and covering the rear frame, and
  wherein the guard body is a lamp relay for activating directional blinkers and blocks an access through a gap around the tail cover to the cable.

12. The guard structure for the seat lock as claimed in claim 11, further comprising a support bracket, through which the key device is mounted on the vehicle, and wherein the lamp relay is provided in the support bracket.

* * * * *